(12) United States Patent
Ring et al.

(10) Patent No.: US 10,273,051 B2
(45) Date of Patent: Apr. 30, 2019

(54) CONTAINER AND HANDLE SYSTEM

(71) Applicant: RING Container Technologies, Oakland, TN (US)

(72) Inventors: Carl D. Ring, Memphis, TN (US); Douglas Miles Dygert, Olive Branch, MS (US); Rusty Shaver, Oakland, TN (US)

(73) Assignee: RING CONTAINER TECHNOLOGIES, Oakland, TN (US)

( * ) Notice: Subject to any disclaimer, the term of this patent is extended or adjusted under 35 U.S.C. 154(b) by 31 days.

(21) Appl. No.: 15/210,947

(22) Filed: Jul. 15, 2016

(65) Prior Publication Data

US 2018/0016062 A1    Jan. 18, 2018

(51) Int. Cl.
| | | |
|---|---|---|
| B65D 23/10 | (2006.01) | |
| B29C 65/58 | (2006.01) | |
| B29C 65/78 | (2006.01) | |
| B29C 65/00 | (2006.01) | |
| B65B 61/00 | (2006.01) | |
| B29L 31/00 | (2006.01) | |
| B29L 31/46 | (2006.01) | |

(52) U.S. Cl.
CPC ............ B65D 23/108 (2013.01); B29C 65/58 (2013.01); B29C 65/7847 (2013.01); B29C 66/131 (2013.01); B29C 66/5324 (2013.01); B29C 66/5344 (2013.01); B29C 66/73921 (2013.01); B29C 66/8322 (2013.01); B65B 61/00 (2013.01); B29L 2031/463 (2013.01); B29L 2031/712 (2013.01)

(58) Field of Classification Search
CPC ...... B65D 23/10–23/16; B65D 25/28–25/325; B65D 33/06; B65D 39/16; B65D 63/18; B29C 2045/007

USPC .................. 215/396, 398; 220/694, 752–776
See application file for complete search history.

(56) References Cited

U.S. PATENT DOCUMENTS

| | | | |
|---|---|---|---|
| 2,535,473 A | 10/1947 | Wolford | |
| 3,036,371 A | 1/1960 | Gray et al. | |
| 3,311,252 A * | 3/1967 | Swartwood | B65D 23/108 |
| | | | 215/397 |
| 3,407,564 A | 10/1968 | Randup | |

(Continued)

FOREIGN PATENT DOCUMENTS

| | | | |
|---|---|---|---|
| WO | WO2006041454 A1 | 4/2006 | |
| WO | WO2015153435 | 10/2015 | |
| WO | WO 2015153435 A1 * | 10/2015 | ............. B65B 61/14 |

OTHER PUBLICATIONS

WO2015153435 (PCT/US2015/023300) International Search Report dated Feb. 7, 2015.

*Primary Examiner* — Kareen K Thomas
(74) *Attorney, Agent, or Firm* — Sorell, Lenna & Schmidt, LLP

(57) ABSTRACT

A container and handle system includes a container including a flange and a top load strength in a range of less than 25 lbf. A handle includes at least one radially oriented tab movable to define a first diameter being greater than a diameter of the flange and configured to facilitate translation over the flange. The at least one tab is biased to a second diameter that is less than the flange diameter such that the at least one tab engages the flange to fix the handle with the container. Packaging products, containers, handles, tooling, applicators and methods are disclosed.

20 Claims, 13 Drawing Sheets

(56) References Cited

U.S. PATENT DOCUMENTS

| | | | | |
|---|---|---|---|---|
| 3,463,536 | A | * | 8/1969 | Beyer ................. A47J 45/077 |
| | | | | 215/396 |
| 4,562,684 | A | | 1/1986 | Dreher |
| 5,768,767 | A | | 6/1998 | Burchell et al. |
| 6,394,517 | B1 | * | 5/2002 | Borg ...................... A45F 5/10 |
| | | | | 215/397 |
| 7,097,061 | B2 | * | 8/2006 | Simpson, Jr. ......... B65D 1/0223 |
| | | | | 215/373 |
| 7,481,325 | B2 | * | 1/2009 | Simpson, Jr. ......... B65D 1/0223 |
| | | | | 215/373 |
| D624,808 | S | * | 10/2010 | Krawczak ................... D8/373 |
| D704,551 | S | * | 5/2014 | Wycoff ................ A47J 45/077 |
| | | | | D9/434 |
| 2004/0188377 | A1 | * | 9/2004 | Balade .................... A45F 5/10 |
| | | | | 215/396 |
| 2004/0194277 | A1 | | 10/2004 | Hunter |
| 2005/0205436 | A1 | * | 9/2005 | Erickson ............. B65D 23/108 |
| | | | | 206/139 |
| 2005/0236356 | A1 | | 10/2005 | Lonsway |
| 2012/0117794 | A1 | | 5/2012 | Tsai et al. |
| 2016/0152366 | A1 | * | 6/2016 | Shaver .................... B65B 61/14 |
| | | | | 53/413 |
| 2016/0153435 | A1 | | 6/2016 | Nakaima et al. |

\* cited by examiner

CONTAINER AND HANDLE SYSTEM

TECHNICAL FIELD

The present invention generally relates to food packaging containers having a handle and more particularly to a container and handle system, and a method for applying a handle to a container.

BACKGROUND

Food packaging containers can be used with a variety of products. In some cases, such containers are blow molded from suitable plastic resins in a range of shapes and sizes. The empty blow-molded containers can be filled with food, food preparation and/or beverage products at a fill site utilizing automated fill equipment. These food packaging containers are adapted to store such products, however, can be difficult in handling, for example, to carry and dispense the food, food preparation and/or beverage products.

In an effort to overcome the above drawbacks, such food packaging containers can be used with a handle to facilitate handling and to aid a consumer in lifting the container and pouring its contents. In one case, a handle includes a plastic ring that is forced to engage and stretch over a neck of a container to facilitate handling one or more connected containers, for example, a six-pack of a canned beverage. In another case, a gallon size plastic container can be employed with a separately molded bail handle that is applied to the container with a large downward force. This disclosure describes an improvement over these prior technologies.

SUMMARY

In one embodiment, a container and handle system is provided. The container and handle system includes a container including a flange and a top load strength in a range of less than 25 lbf. A handle includes at least one radially oriented tab movable to define a first diameter being greater than a diameter of the flange and configured to facilitate translation over the flange. The at least one tab is biased to a second diameter that is less than the flange diameter such that the at least one tab engages the flange to fix the handle with the container. Packaging products, containers, handles, tooling, applicators and methods are disclosed.

In one embodiment, a method for applying a handle to a container is provided. The method comprises the steps of: engaging at least one radially oriented tab of a handle to define a first diameter being greater than a diameter of a flange of a container having a top load strength in a range of less than 25 lbf; supporting the handle with an applicator; disengaging the handle from the applicator such that the at least one tab translates over the flange; and positioning the at least one tab to engage a surface of the flange to fix the handle with the container, the at least one tab being biased to define a second diameter that is less than the flange diameter.

BRIEF DESCRIPTION OF THE DRAWINGS

The present disclosure will become more readily apparent from the specific description accompanied by the following drawings, in which.

DETAILED DESCRIPTION

Figure 1:
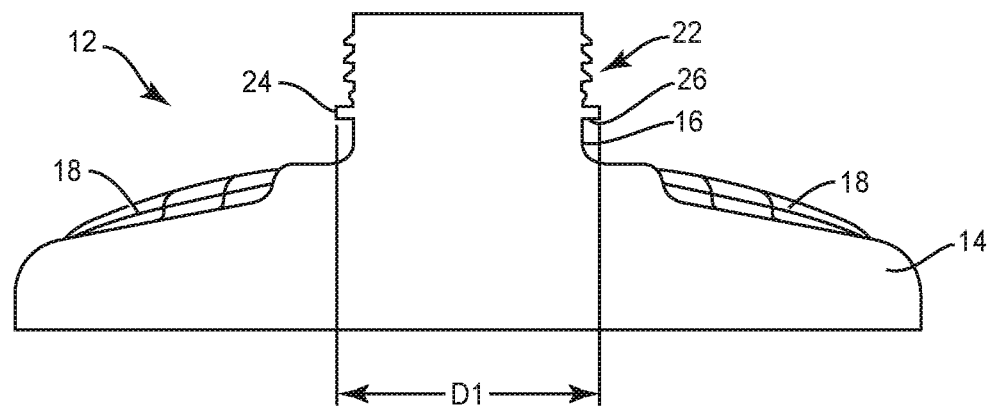
FIG. 1 is a break away cross section view of components of one embodiment of a container and handle system in accordance with the principles of the present disclosure.
Figure 2:
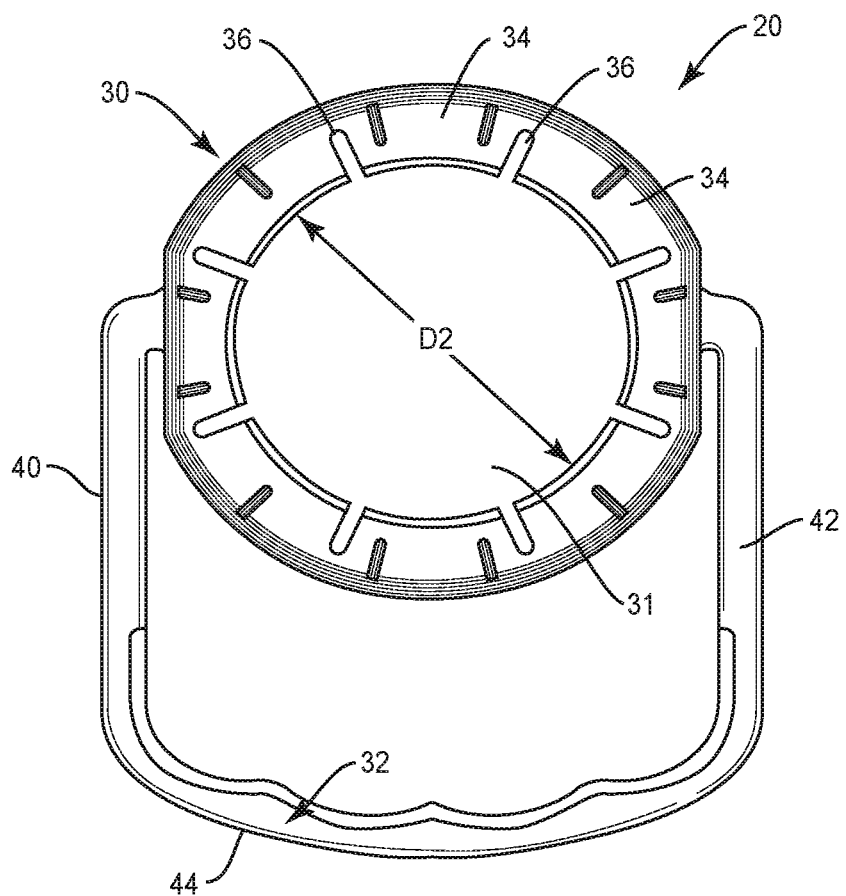
FIG. 2 is a plan view of components of one embodiment of a container and handle system in accordance with the principles of the present disclosure

The exemplary embodiments of food packaging containers having a handle and more particularly, a container and handle system, and a method for applying a handle to a container are discussed in terms of containers that can be filled with food, food preparation and/or beverage products. In some embodiments, the container may be made of plastic, for example, polyethylene terephthalate (PET), which can be blow molded into various configurations. In some embodiments, the container can be filled with food, food preparation oils, viscous and/or beverage products. In some embodiments, the container can be employed as a cold fill container. In some embodiments, the container can be employed as a hot fill container. In some embodiments, the present container and handle system includes a container that is employed with a method for manufacturing food packaging made from PET with minimal weight and selectively desirable physical performance features such as volumetric efficiency. In some embodiments, the container includes a large plastic container for edible oil packaging.

In some embodiments, the container may include blow-molded plastic jugs or bottles. In some embodiments, the jugs or bottles may be used for dispensing toxic or flammable liquids. In some embodiments, the container may include a 35 pound or 5 gallon jug. In some embodiments, the container may be manufactured via an injection molded preform, which is subjected to a blow mold process. In some embodiments, the container may be manufactured and subjected to a trimming process.

In some embodiments, the present container and handle system includes a container that is manufactured from PET and a handle that is attachable with the container. In some embodiments, the handle is molded from rigid plastic and is not configured to be flexed, expanded, compressed and/or stretched while being applied to the container. In some embodiments, the handle includes a rigid outer ring with foldable inner tabs, which can be folded to face at an upward angle.

In some embodiment, the handle includes an outer ring portion. In some embodiments, the ring portion may be variously shaped, such as, for example, circular, triangle, square, rectangle, trapezoid, irregular shapes or a combination thereof configured to engage a portion of a container, such as, for example, an upper or neck portion of a container. In some embodiments, the ring portion includes at least one hollow slot or opening configured to fit over the neck of the container. In some embodiments, the handle comprises a plurality of tabs disposed radially inward around the circumference of the ring portion and extending toward the opening. In some embodiments, the tabs provide a foundation and leverage to facilitate assembly of the container and handle system.

In some embodiments, the handle includes a plurality of grooves and ridges disposed between one or more of the tabs. In some embodiments, the width of the grooves is not constant. In some embodiments, the width of the grooves can vary depending on the shapes of tabs. In some embodiments, the tabs may be variously shaped, such as, for example, circular, triangle, square, rectangle, oval, irregular shapes, or a combination thereof. In some embodiments, the grooves and ridges provide flexibility and resiliency as the tabs are bending or folded between a horizontal or an angled orientation relative to the handle to a vertical orientation or an angled orientation. In some embodiments, the tabs exert a force on the container to resist and/or prevent removal of the handle from the container such that the container can be transported and/or carried.

In some embodiments, the handle includes one or more cutouts, slits and/or openings adjacent the tabs provide flexibility and resiliency and may be variously shaped including for example, circle, triangle, square, rectangle, oval or a combination thereof. In some embodiments, the tabs include frictional features that provide structural features that allow the container and handle system to be applied on different sized containers with different size container necks.

In some embodiments, the handle includes tabs having a tensile modulus (Young's Modulus, Modulus of Elasticity) from about 0.01 to about 100.00 GPa. In some embodiments, the tabs are configured to be resiliently biased to move, pivot, rotate, deform and/or flex from a folded position toward a planar position relative to a plane of the handle.

In some embodiments, the tabs are configured for moving, pivoting, rotating, deforming and/or flexing between a first orientation relative to a plane of the handle and a second orientation relative to the plane of the handle. In some embodiments, the tabs are configured for moving, pivoting, rotating, deforming and/or flexing through a range of about 0 to 180 angular degrees. In some embodiments, the tabs are moved, pivoted, rotated, deformed and/or flexed upward to a selected angle relative to the plane of the handle to define a diameter being larger than a diameter of a flange of a container. In some embodiments, the tabs are disposed at the selected angle and biased to a diameter smaller that the diameter of the flange.

In some embodiments, the ring portion comprises a reinforced ring supporting a neck-engaging collar. In some embodiments, the neck-engaging collar is an outer frame portion. In some embodiments, the frame portion comprises various shapes containing a hollow slot or opening. In some embodiments, the frame provides a base and a planar surface for the foundation of tabs where tabs can bend up and down from 0 to 180 degree relative to the surface of the frame.

In some embodiments, the present container and handle system is employed with a method for applying a handle to a container. In some embodiments, the method includes the step of disposing a handle adjacent to a container. In some embodiments, the method includes the step of orienting the handle with an applicator machine to move, pivot, rotate, deform and/or flex tabs of the handle between a first orientation relative to a plane of the handle and a second orientation relative to the plane of the handle. In some embodiments, the method includes the step of bending and/or folding the tabs in a facing upward orientation.

In some embodiments, the method includes the step of placing the handle on top of the container's neck opening. In some embodiments, the method includes the step of translating the rigid outer ring of the handle relative to the container's neck until the tabs are selectively positioned with the container's neck threads and transfer bead. In some embodiments, the method includes the step of translating the rigid outer ring of the handle relative to the container's neck such that the tabs, disposed in a selected orientation such as a folded orientation as described herein, translate over the threads and transfer bead of the container. In some embodiments, upon disposal of the tabs past the transfer bead, the method includes the step of allowing the tabs, which are biased to a pre-folded, bent, moved, pivoted, rotated, deformed and/or flexed orientation, to naturally close back to the initial and/or original orientation, such that the handle engages a surface of the container neck or grips the shoulder beneath the transfer bead. In some embodiments, the system and method of the present disclosure provides a container and handle configuration such that removal of handle from the container is resisted and/or prevented. In some embodiments, the method includes the step of applying the handle to the container prior to the container being filled or capped with a product, as described herein.

In some embodiments, the container weighs 260 grams empty and 35 pounds when filled with a product, as described herein. In some embodiments, the container has a top load strength of 8 to 10 pound-force (lbf) empty prior to failure. In some embodiments, the container has a neck diameter of 63 millimeters (mm). In some embodiments, the present container has a small diameter with a relatively small diameter neck finish. In some embodiments, the present container includes flat shoulders for volumetric efficiency.

In some embodiments, the present container and handle system is employed with a method for applying a handle to a container that includes the steps providing an apparatus that pre-folds handle tabs to an outward position before the handle is placed on the container neck. In some embodiments, the apparatus is not dependent on the strength of the container neck. In some embodiments, the apparatus pre-flexes the tabs into an open position in a first operation, then slides the handle onto the container neck in a second operation. This configuration avoids application of load to the container.

In some embodiments, the method includes the step of capturing a handle with pre-oriented and/or folded tabs. In some embodiments, the method includes the step of forcing the handle onto a provisional metal neck finish of the apparatus that can withstand a selected downward force. In some embodiments, the provisional neck finish has a diameter similar to that of a transfer bead of the actual container. In some embodiments, the provisional neck finish does not have a smaller relief diameter beneath the bead. In some embodiments, the method includes the step of removing the handle from the provisional neck finish.

In some embodiments, the method includes the step of translating the handle from the provisional neck finish and onto a carrier of the apparatus. In some embodiments, the method includes the step of moving the carrier with the handle into position over a container neck. In some embodiments, the method includes the step of moving the carrier with the handle into position over a container neck over a duration of a few seconds. In some embodiments, the method includes the step of releasing the handle onto the container neck. In some embodiments, the method includes the step of releasing the handle onto the container neck such that the handle falls freely past the transfer bead. In some embodiments, the system and method of the present disclosure provides a container and handle configuration such that once the handle tabs are beneath the transfer bead, the tabs slowly and/or naturally are biased and/or return to their original orientation for gripping the bottom ledge of the bead.

In some embodiments, the system and method of the present disclosure provides a container and handle configuration such that the handle tabs close immediately after removal from the provisional neck finish. In some embodiments, the apparatus includes a provisional shoulder of the carrier. In some embodiments, the provisional shoulder maintains the tabs in a full open position while the handle is being transferred from the provisional neck finish.

In some embodiments, the system and method of the present disclosure provides a container and handle configuration such that the handle tabs slowly and/or naturally are biased and/or close to their original orientation over a duration of a minute or more.

The present disclosure may be understood more readily by reference to the following detailed description of the embodiments taken in connection with the accompanying drawing figures, which form a part of this disclosure. It is to be understood that this application is not limited to the specific devices, methods, conditions or parameters described and/or shown herein, and that the terminology used herein is for the purpose of describing particular embodiments by way of example only and is not intended to be limiting. Also, in some embodiments, as used in the specification and including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment. It is also understood that all spatial references, such as, for example, horizontal, vertical, top, upper, lower, bottom, left and right, are for illustrative purposes only and can be varied within the scope of the disclosure. For example, the references "upper" and "lower" are relative and used only in the context to the other, and are not necessarily "superior" and "inferior".

The following discussion includes a description of components of a container and handle system, methods of manufacturing the container and handle system including applying a handle to a container, and related components. Alternate embodiments are also disclosed. Reference is made in detail to the exemplary embodiments of the present disclosure, which are illustrated in the accompanying figures. Turning to FIGS. 1-5, there are illustrated components of a container and handle system 10.

Container and handle system 10 includes a container 12. Container 12 includes a body 14 and a cylindrical neck 16. Body 14 defines a longitudinal axis and includes shoulders 18 extending from neck 16. Shoulders 18 include a substantially flat or planar configuration and are disposed in a substantially perpendicular orientation relative to the longitudinal axis of body 14. In some embodiments, body 14 has a top load strength of less than 25 lbf. In some embodiments, body 14 has a top load strength in a range of 8.0 through 10.0 lbf, for example, a force applied to components of body 14 such as neck 16 and/or shoulders 18. In some embodiments, neck 16 and/or shoulders 18 are configured to withstand a top load force in a range of 8 lbf through 10 lbf prior to plastic deformation and/or failure of one or more components of body 14. In some embodiments, all or a portion of shoulders 18 may be disposed at various orientations relative to the longitudinal axis of body 14, such as, for example, transverse and/or other angular orientations such as acute or obtuse, co-axial and/or may be offset or staggered. In some embodiments, shoulders 18 include a curvature with an increasing gradient from a sidewall portion toward neck 16, as described herein. In some embodiments, body 14 has a sloped transition between shoulders 18 and neck 16. In some embodiments, neck 16 has a diameter in a range of 50 through 75 mm. In some embodiments, neck 16 has a diameter of 63 mm. In some embodiments, neck 16 has a diameter of less than 50 mm.

Neck 16 includes a threaded portion 22 configured for engagement with a cap (not shown) of container 12. Neck 16 includes a flange, such as, for example, a transfer bead 24, as shown in FIG. 1. Transfer bead 24 is disposed in a substantially perpendicular orientation relative to the longitudinal axis of body 14. Transfer bead 24 is positioned distally relative to threaded portion 22. Transfer bead 24 extends circumferentially about neck 16 and outwardly a distance from a surface of neck 16. Transfer bead 24 defines a diameter D1, which is greater than the portion of neck 16 extending distally therefrom and/or a portion of the transition of neck 16 to shoulders 18. Bead 24 includes a surface 26 configured to engage a portion of a handle 20, as described herein. Handle 20 is selectively positioned with transfer bead 24 and oriented to engage surface 26 to resist and/or prevent disengagement of handle 20 from container 12, as described herein.

In some embodiments, container 12 includes a finished PET blow-molded container 12, as shown in FIG. 1. In some embodiments, container 12 is constructed for use with a selected packaging application, such as, for example, filling, storage and/or dispensing of food, food preparation oils, viscous and/or beverage products. In some embodiments, container 12 includes a lower supporting base portion and a sidewall portion extending upwardly from the base portion (not shown). In some embodiments, container 12 is manufactured via a two-stage method and is formed by injection molding. In some embodiments, a preform is placed into a cavity of a mold assembly to be blown. In some embodiments, container 12 is manufactured with a low center of gravity.

Handle 20 includes a mounting band 30 and a handle portion 32, as shown in FIGS. 2-5. Band 30 defines an opening 31 disposed in a plane P1. Opening 31 is configured to fit over neck 16 for assembly of handle 20 and body 14, as described herein. In some embodiments, band 30 comprises an outer ring portion of handle 20 having a circular configuration. In some embodiments, band 30 may alternatively include various shapes, such as, for example, triangle, square, rectangle, trapezoid, irregular shapes or a combination thereof configured to engage neck 16, as described herein.

Band 30 includes a plurality of radial, inwardly oriented tabs 34. Upon assembly of handle 20 with body 14, as described herein, tabs 34 are oriented to engage and exert a force on surface 26 to resist and/or prevent removal of handle 20 from container 12 such that container 12 can be transported and/or carried. In some embodiments, tabs 34 frictionally engage surface 26. In some embodiments, tabs 34 may include various shapes, such as, for example, circle, triangle, square, rectangle, oval, irregular shapes, or a combination thereof. In some embodiments, band 30 may include a single tab 34.

In some embodiments, tabs 34 are connected with band 30 and movable, pivotable, rotatable, deformable and/or flexible between a first orientation and a second orientation relative to plane P1 of handle 20, as described herein. In some embodiments, tabs 34 and/or band 30 have a tensile modulus from about 0.01 to about 100 GPa to facilitate movement, pivoting, rotation, deformation and/or flexing between a first orientation and a second orientation. In some embodiments, tabs 34 are connected with band 30 and biased to the first orientation and/or the second orientation. In some embodiments, tabs 34 are connected with band 30 and resiliently biased to the first orientation and/or the second orientation. In some embodiments, tabs 34 are configured for moving, pivoting, rotating, deforming and/or flexing through a range of about 0 to 180 angular degrees relative to plane P1. In some embodiments, tabs 34 are moved, pivoted, rotated, deformed and/or flexed upward to a selected angle relative to plane P1 to define a diameter being larger than a diameter of transfer bead 24, as described herein. In some embodiments, tabs 34 are disposed at the selected angle and biased to a diameter smaller that the diameter of transfer bead 24, as described herein.

In some embodiments, tabs 34 can be disposed in a folded, bent, moved, pivoted, rotated, deformed and/or flexed orientation. In some embodiments, with tabs 34 disposed in a folded orientation and upon assembly of handle 20 with container 12, as described herein, tabs 34 are biased for movement and/or naturally close to an orientation of tabs 34 with transfer bead 24 such that tabs 34 engage surface 26. In some embodiments, with tabs 34 disposed in a folded orientation and upon assembly of handle 20 with container 12, as described herein, tabs 34 are biased for movement and/or naturally close to a selected orientation of tabs 34 from a first diameter to a second diameter over a duration of time. In some embodiments, the duration of time includes at least two seconds. In some embodiments, the duration of time includes a range of 1 through 5 seconds.

Tabs 34 are separated by cavities, such as, for example, slots 36 disposed between two adjacent tabs 34. Slots 36 are configured to facilitate movement, pivoting, rotation, deformation and/or flexing between a first orientation and a second orientation. In some embodiments, the cavities disposed between adjacent tabs 34 include one or a plurality of grooves, ridges, cutouts, slits and/or openings and may be variously shaped including for example, circle, triangle, square, rectangle, oval or a combination thereof. In some embodiments, the width of the cavities may be constant, uniform, non-uniform, tapered, increasing, decreasing, staggered and/or offset.

Figure 3:
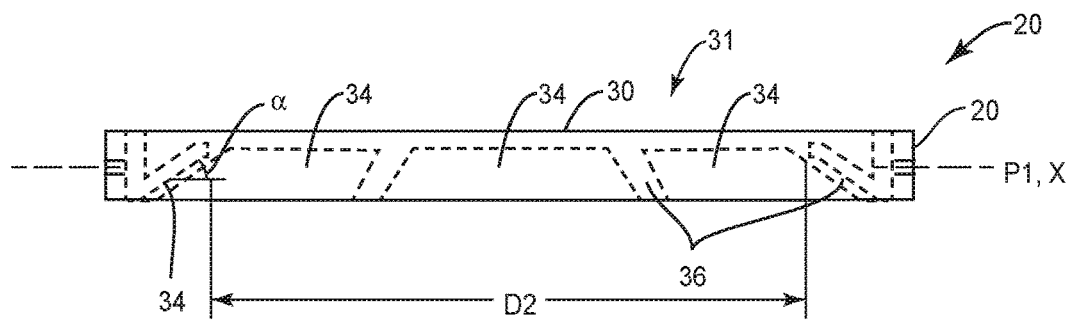
FIG. 3 is a side view in part phantom of the components shown in FIG. 2.

For example, tabs 34 are initially disposed in an orientation, as shown in FIG. 3, such that tabs 34 are disposed at an angle $\alpha$ relative to plane P1 and/or an axis X, which is disposed substantially transverse and perpendicular to the longitudinal axis of body 14. In the initial orientation shown in FIG. 3, tabs 34 define a diameter D2. Diameter D2 is less than diameter D1 of transfer bead 24 such that upon assembly of handle 20 with body 14, tabs 34 are oriented to engage surface 26 to fix handle 20 with container 12, as described herein. In some embodiments, angle $\alpha$ includes 45 angular degrees. In some embodiments, angle $\alpha$ includes an angle in a range of 0 through 180 angular degrees.

Figure 4:
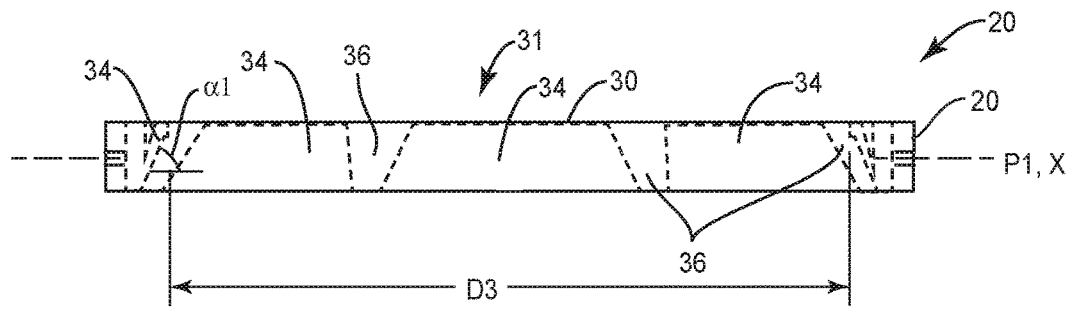
FIG. 4 is a side view in part phantom of the components shown in FIG. 2.
Figure 5:
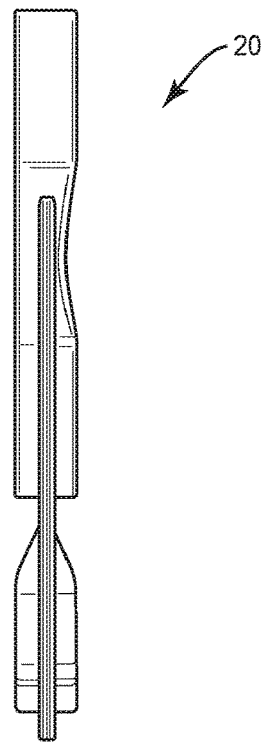
FIG. 5 is a side view of the components shown in FIG. 2.

Tabs 34 are movable, pivotable, rotatable, deformable and/or flexible, for example via manufacturing and assembly tooling as described herein, to a bent or folded orientation, as shown in FIG. 4, such that tabs 34 are disposed at an angle $\alpha 1$ relative to plane P1 and/or axis X. In some embodiments, angle $\alpha 1$ includes 80 angular degrees. In some embodiments, angle $\alpha 1$ includes an angle in a range of 45 through 90 angular degrees. In the bent or folded orientation, tabs 34 define a diameter D3, which is greater than diameter D1 of transfer bead 24. Diameter D3 is configured to facilitate a non-interfering translation over transfer bead 24. Tabs 34 are resiliently biased such that upon translation of handle 20 over transfer bead 24, tabs 34 rotate to the initial orientation to define diameter D2 such that tabs 34 are oriented to engage surface 26 to resist and/or prevent removal of handle 20 from container 12.

In some embodiments, tabs 34 are flexible and capable of bending, flexing, and moving from about 0 to 180 degree relative to plane P1 and/or axis X. In some embodiments, tabs 34 are flexible and resilient as tabs 34 are bent or folded between a horizontal or an angled orientation relative to handle 20 to a vertical orientation or an angled orientation. In some embodiments, tabs 34 are configured to flex between the orientations to facilitate translation over neck 16, as described herein.

Handle portion 32 includes a pair of arms 40 and 42. In some embodiments, arms 40, 42 are generally U-shaped and include a grip 44, which spans the width between arms 40, 42. Grip 44 provides access to handle 20 and facilitates carrying and/or transport of container 12 with handle 20 as tabs 34 engage transfer bead 24 and resist and/or prevent removal of handle 20 from container 12, as described herein.

In some embodiments, handle 20 may be fabricated from plastic and formed using injection and compression molding processes. In some embodiments, handle 20 and/or container 12 may be fabricated from polyester (PES), polyethylene (PE), high-density polyethylene (HDPE), polyvinyl chloride (PVC), polyvinylidene chloride (PVDC) (Saran), low-density polyethylene (LDPE), polypropylene (PP), polystyrene (PS), high impact polystyrene (HIPS), polyamides (PA) (Nylons), acrylonitrile butadiene styrene (ABS), polyethylene/acrylonitrile butadiene styrene (PE/ABS), polycarbonate (PC), polycarbonate/acrylonitrile butadiene styrene (PC/ABS), and/or polyurethanes (PU).

Figure 6:
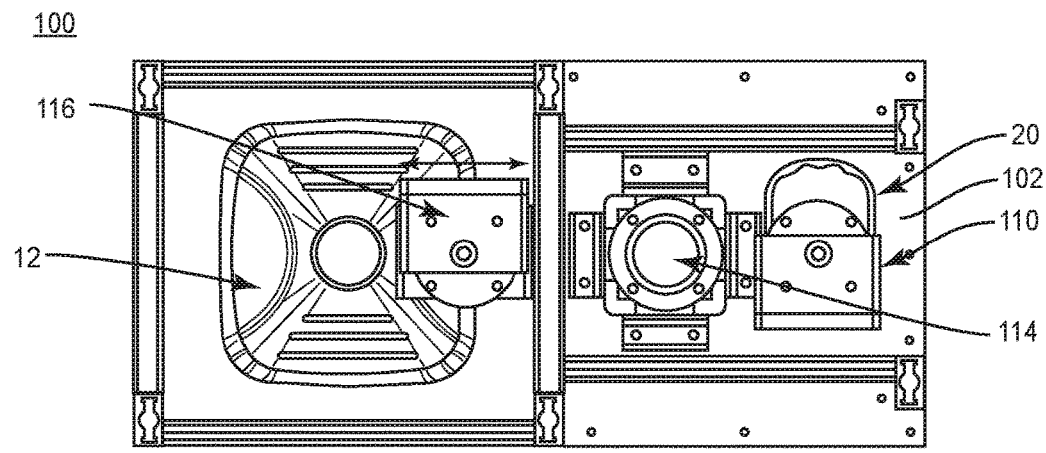
FIG. 6 is a plan view of components of one embodiment of an applicator system in accordance with the principles of the present disclosure.
Figure 7:
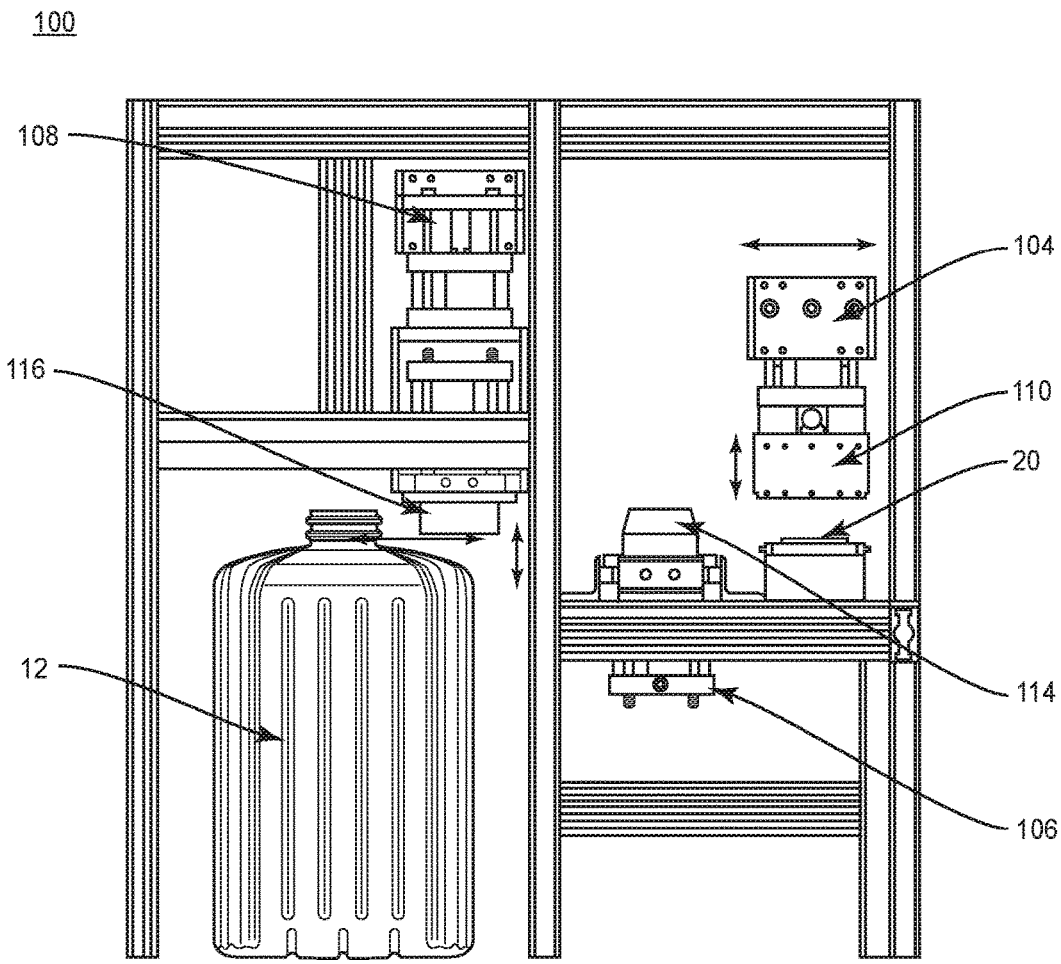
FIG. 7 is a plan view of components of one embodiment of an applicator system in accordance with the principles of the present disclosure.

In some embodiments, container and handle system 10 is assembled and/or manufactured employing manufacturing tooling, such as, for example, an apparatus 100, as shown in FIGS. 6 and 7. Apparatus 100 includes an initial supply point 102 for handle 20, a vacuum cup mount 104, a stationary applicator mount, such as, for example, a mandrel mount 106 and an applicator mandrel mount 108. A vacuum cup 110 is movably attached to vacuum cup mount 104 to move in a vertical direction for engaging handle 20 at initial supply point 102. Vacuum cup 110 is configured to move horizontally to position vacuum cup 110 above a stationary mandrel 114. An applicator mandrel, such as, for example, a carrier 116 is movably attached to applicator mandrel mount 108 to move vertically and in an upward and downward direction. Mandrel mount 106 is configured to move horizontally to position carrier 116 above stationary mandrel 114 and container 12, as described herein.

Figure 8:
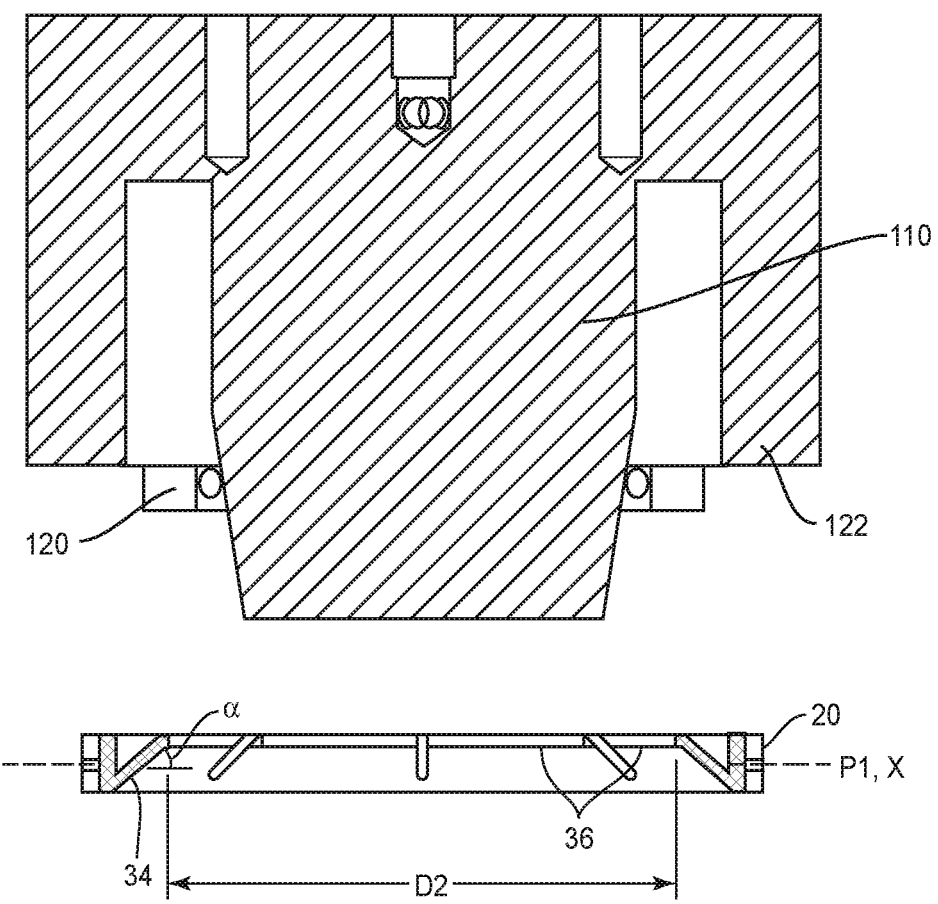
FIG. 8 is a cross section view of components of one embodiment of an applicator system and a container and handle system in accordance with the principles of the present disclosure.
Figure 9:
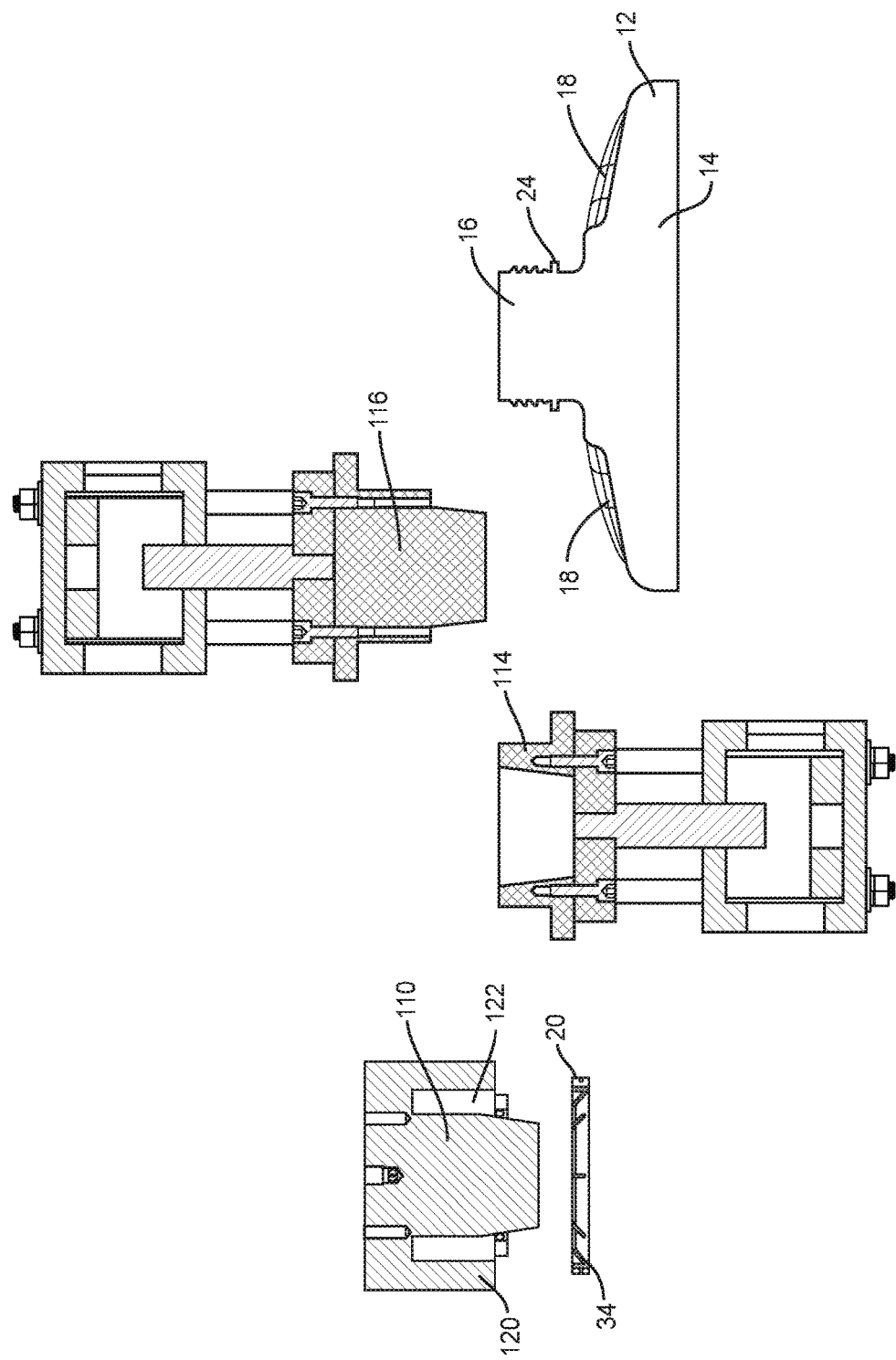
FIG. 9 is a cross section view of components of one embodiment of an applicator system and a container and handle system in accordance with the principles of the present disclosure.

In operation, to assemble handle 20 with container 12, container 12 is initially empty and/or unfilled at the time of manufacture/assembly. Container 12 is disposed with apparatus 100. Handle 20 is fabricated and provided such that tabs 34 are disposed in an orientation with tabs 34 disposed at an angle a relative to plane P1 and/or an axis X, as shown in FIGS. 8 and 9. Tabs 34 define diameter D2, as described herein.

Figure 10:
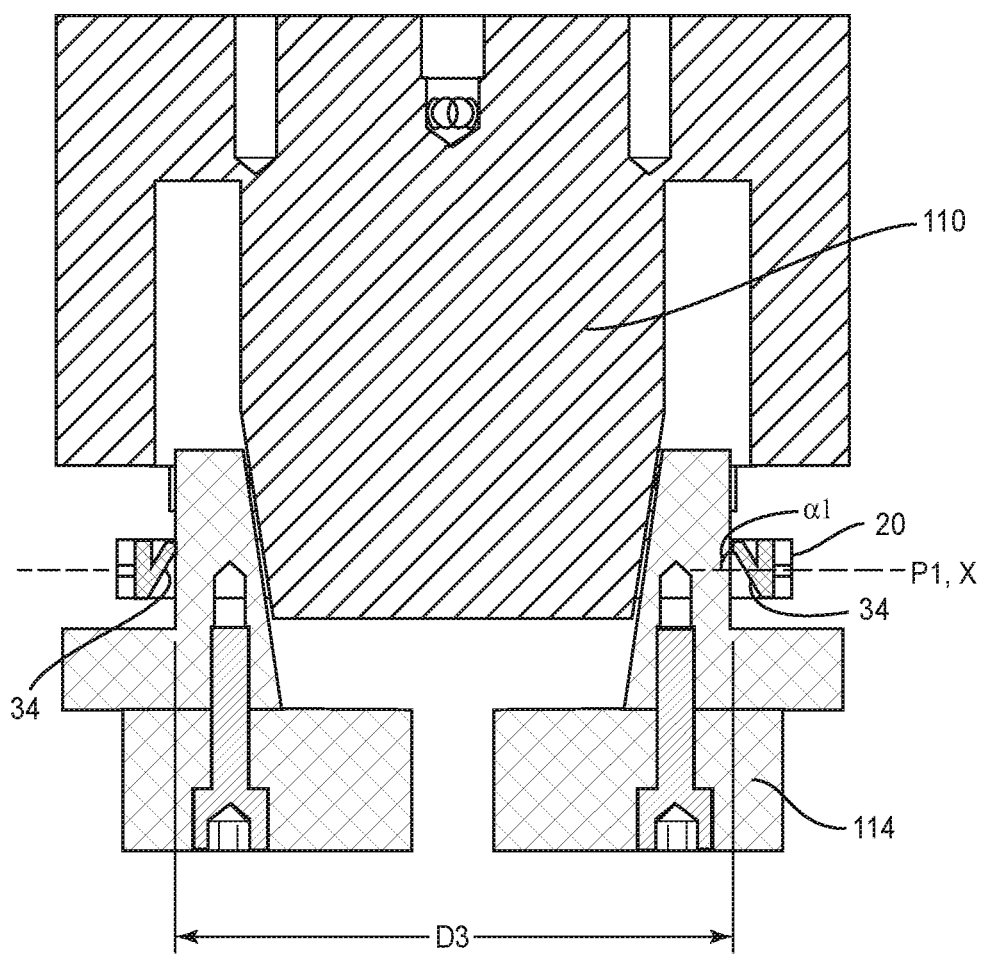
FIG. 10 is a cross section view of components of one embodiment of an applicator system and a container and handle system in accordance with the principles of the present disclosure.

Vacuum cup 110 captures and/or picks up handle 20 for support thereof, as shown in FIGS. 8-10. Vacuum cup 110 includes openings 120 for applying a vacuum to handle 20 and a surface 122 for supporting handle 20. After a vacuum is applied to vacuum cup 110 and handle 20 is engaged with surface 122, vacuum cup 110 is moved vertically upward and then horizontally to be positioned above stationary mandrel 114.

Figure 11:
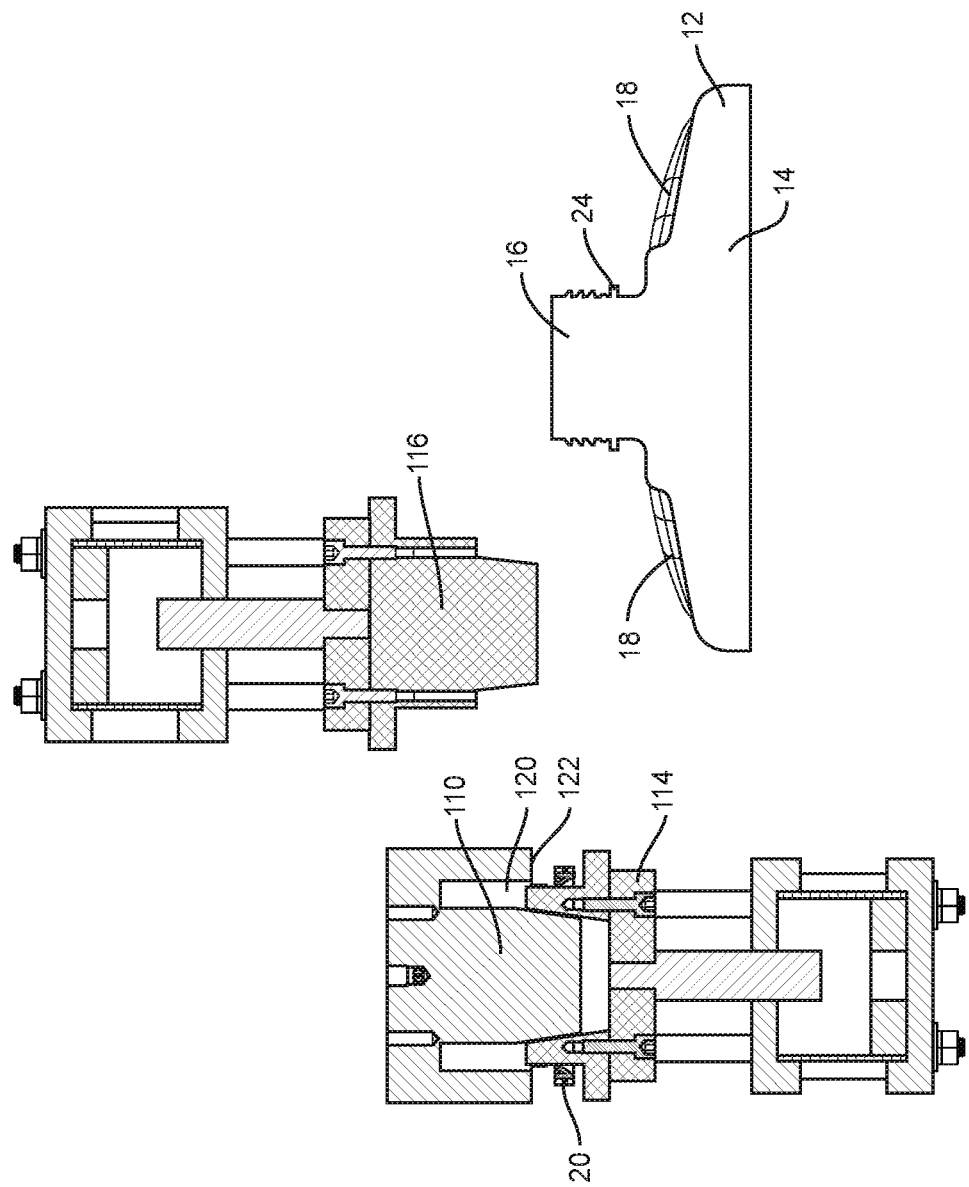
FIG. 11 is a cross section view of components of one embodiment of an applicator system and a container and handle system in accordance with the principles of the present disclosure.

Handle 20 is translated over stationary mandrel 114. Vacuum cup 110 is lowered to push handle 20 over stationary mandrel 114 using surface 122 to pivot, rotate, deform and/or flex tabs 34 between the orientation shown in FIG. 3 and the orientation shown in FIG. 4. Engagement of tabs 34 with a surface of stationary mandrel 114 causes tabs 34 of handle 20 to be pivoted, rotated, deformed and/or flexed upward to the orientation shown in FIG. 4. Tabs 34 pivot, rotate, deform and/or flex from diameter D2 to diameter D3 such that tabs 34 are disposed at an angle a1 relative to plane P1 and/or axis X, as shown in FIGS. 10 and 11. The vacuum on vacuum cup 110 is released and vacuum cup 110 is moved vertically upward and then horizontally to be positioned above initial supply point 102 to engage another handle 20.

Figure 12:
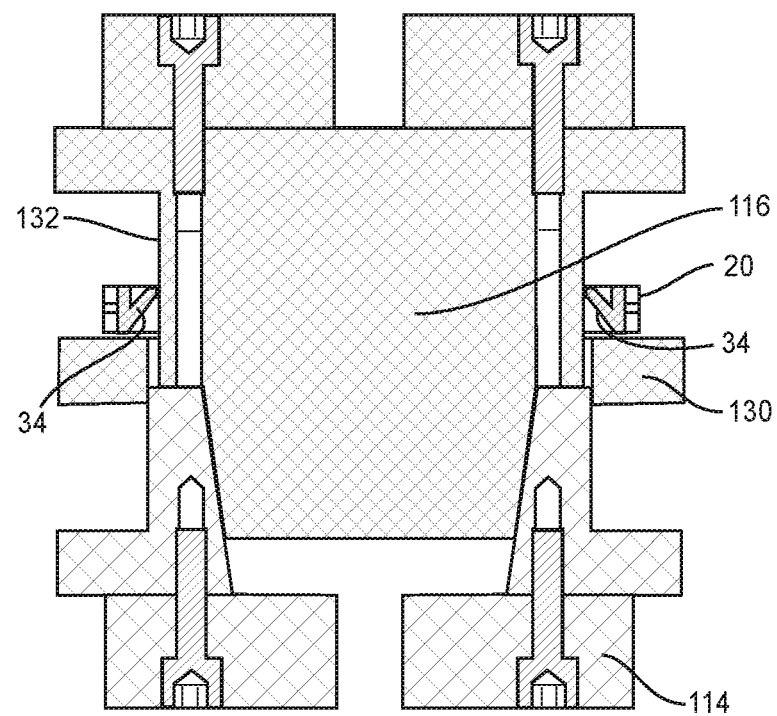
FIG. 12 is a cross section view of components of one embodiment of an applicator system and a container and handle system in accordance with the principles of the present disclosure.
Figure 13:
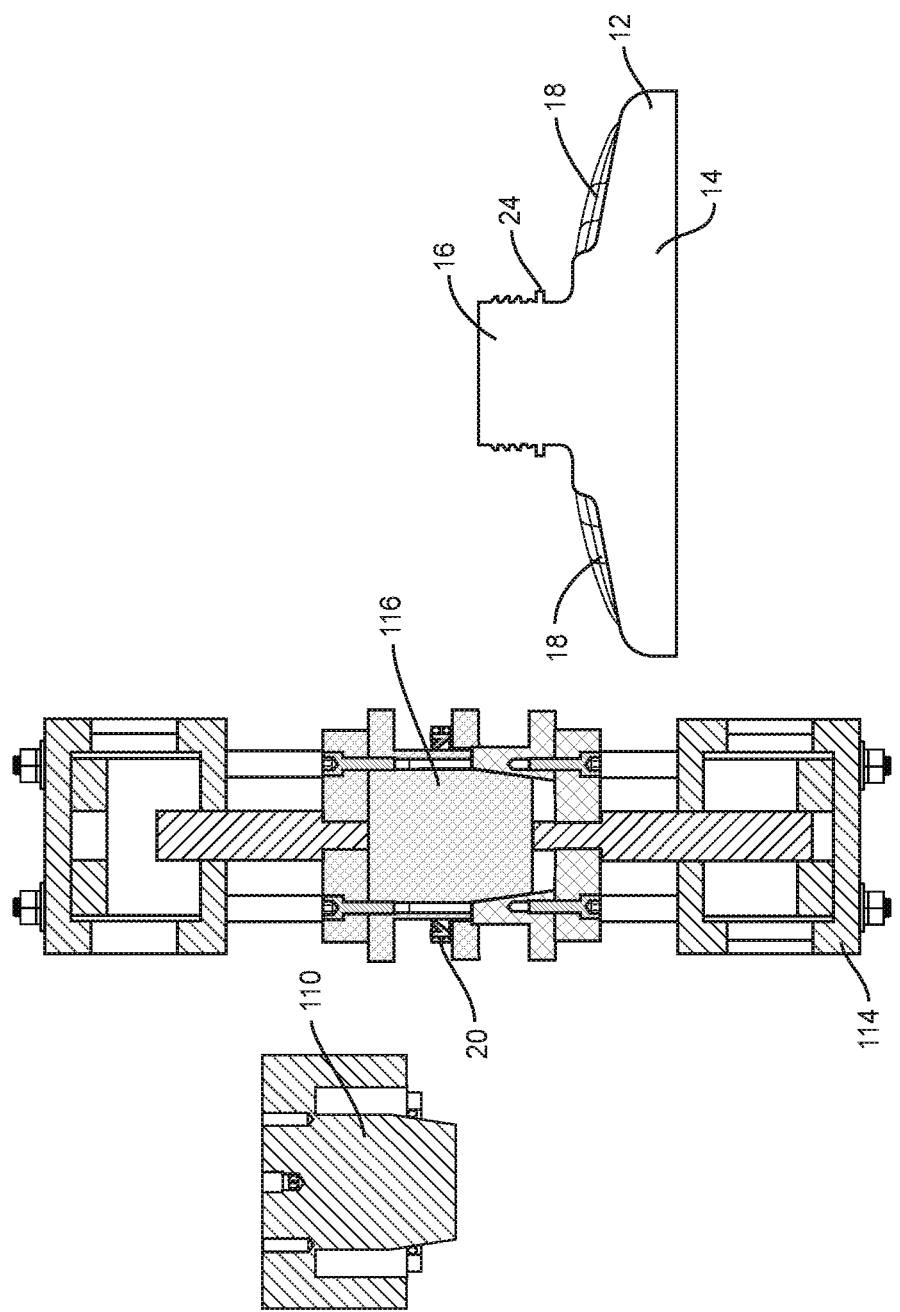
FIG. 13 is a cross section view of components of one embodiment of an applicator system and a container and handle system in accordance with the principles of the present disclosure.

Handle 20 is transferred from stationary mandrel 114 to carrier 116, as shown in FIGS. 12 and 13. Applicator mandrel mount 108 translates horizontally to be positioned over stationary mandrel 114. Carrier 116 is moved vertically downward to engage stationary mandrel 114. Stationary mandrel 114 is fitted with a lower pressing collar 130 that is configured to move up and down in a vertical direction. To move handle 20 from stationary mandrel 114 to carrier 116, collar 130 is moved upward to engage and translate handle 20 onto an engaging surface 132 of carrier 116, as shown in FIG. 12. Tabs 34 are maintained in the folded orientation to define the expanded diameter D3.

Figure 14:
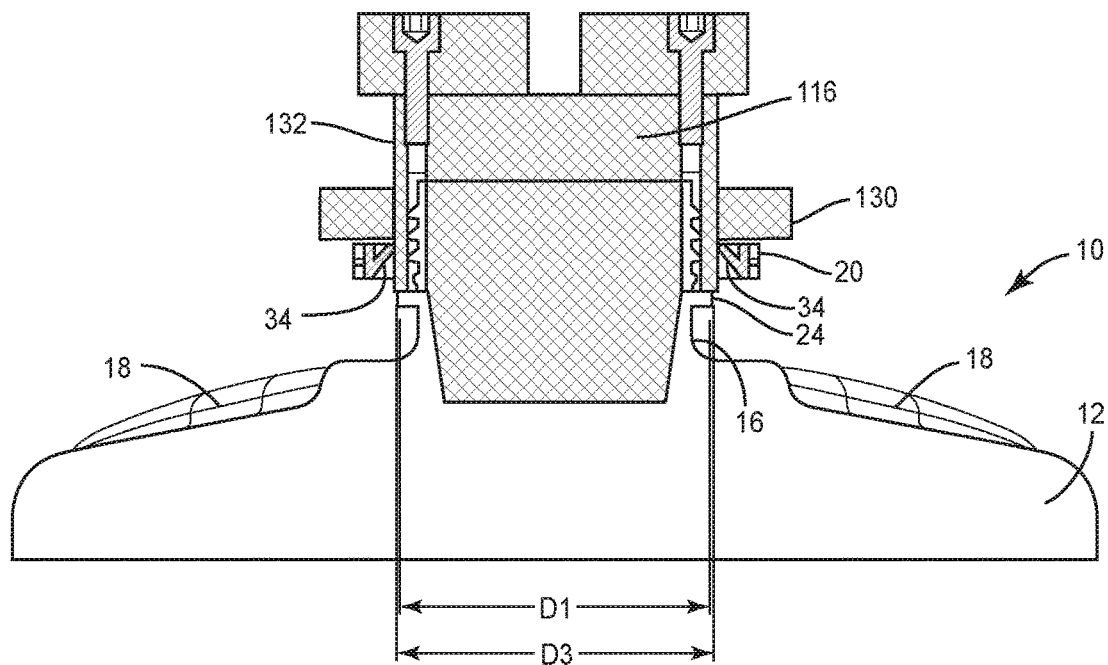
FIG. 14 is a cross section view of components of one embodiment of an applicator system and a container and handle system in accordance with the principles of the present disclosure.

After handle 20 is moved to carrier 116, applicator mandrel mount 108 moves carrier 116 vertically upward from stationary mandrel 114 and then horizontally to be positioned above container 12. Carrier 116 is lowered to engage neck 16 such that threaded portion 22 is disposed within carrier 116, as shown in FIGS. 14-17. Diameter D3 of tabs 34 is greater than diameter D1 of bead 24, as shown in FIG. 14, to allow application of handle 20 with container 12 by apparatus 100 for manufacture/assembly of handle 20 and container 12.

Figure 15:
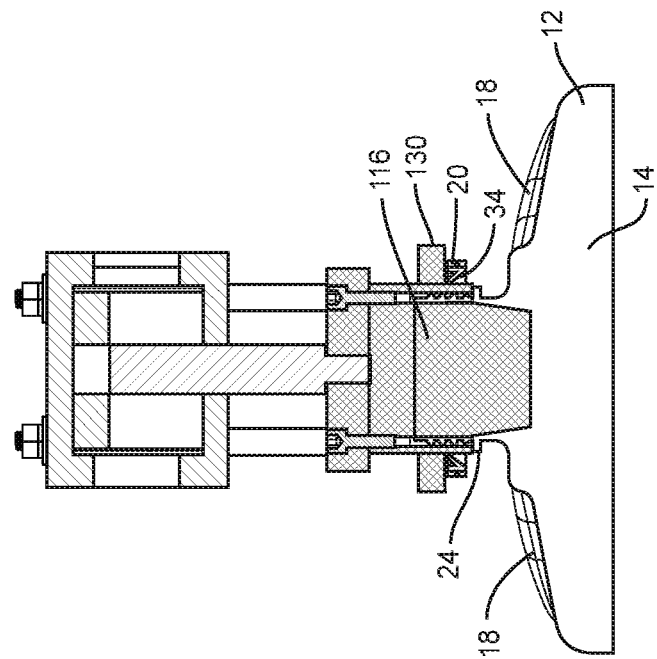
FIG. 15 is a cross section view of components of one embodiment of an applicator system and a container and handle system in accordance with the principles of the present disclosure.
Figure 15:
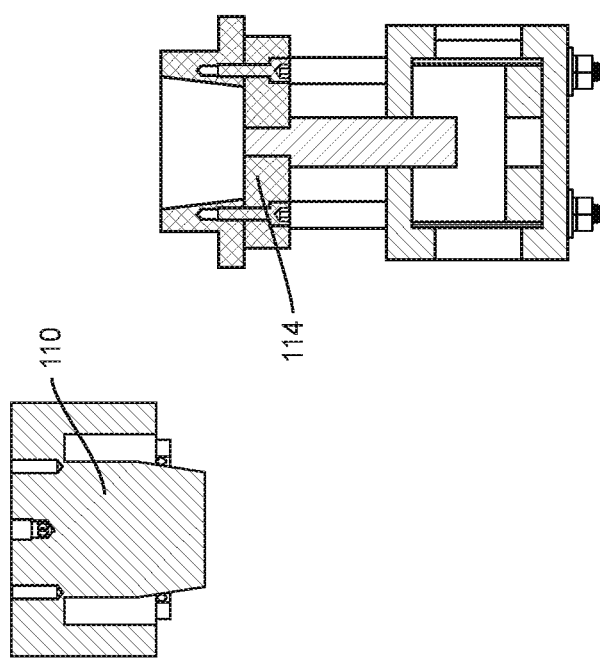
Figure 16:
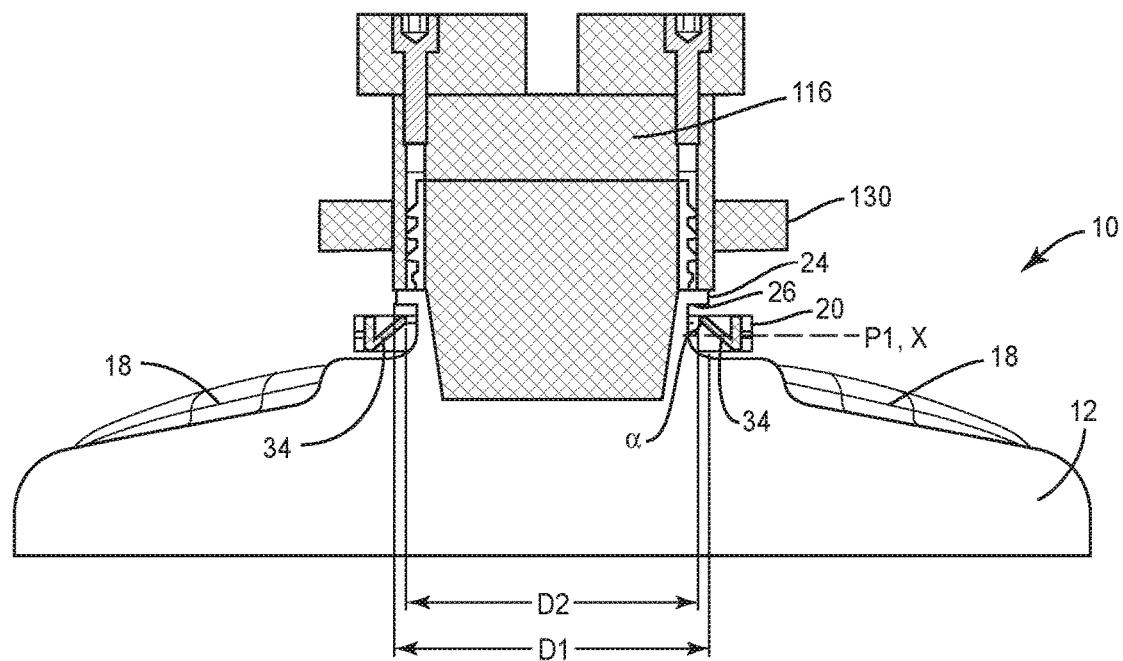
FIG. 16 is a cross section view of components of one embodiment of an applicator system and a container and handle system in accordance with the principles of the present disclosure.
Figure 17:
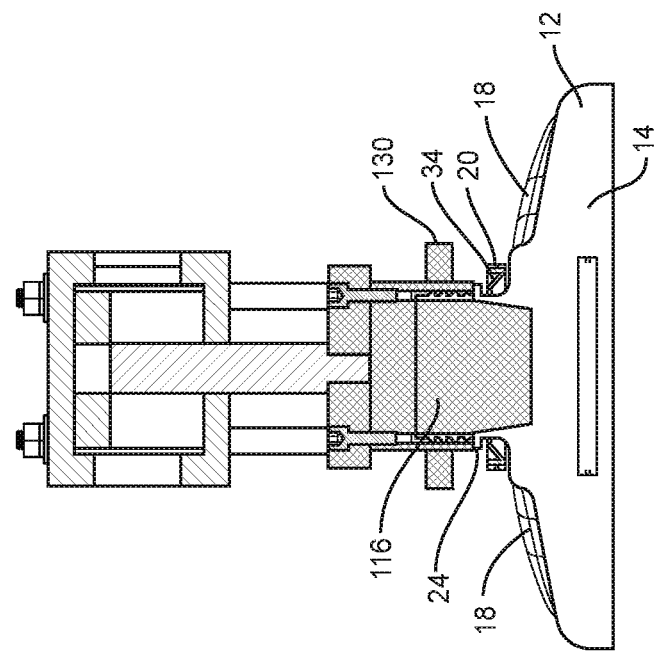
FIG. 17 is a cross section view of components of one embodiment of an applicator system and a container and handle system in accordance with the principles of the present disclosure.
Figure 17:
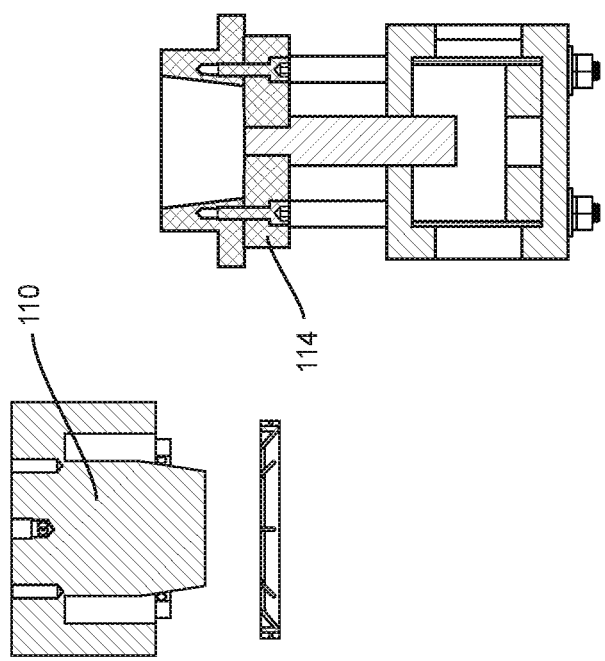

Handle 20 is disengaged from carrier 116 to allow application of handle 20 with container 12. One or more components of apparatus 100 apply a force to one or more portions of container 12 and collar 130 applies a force to handle 20 to slide handle 20 along surface 132 for disengaging handle 20 from carrier 116 and translating handle 20 along transfer bead 24 onto neck 16 and/or shoulders 18, as shown in FIGS. 14-16. In some embodiments, carrier 116 applies a force to transfer bead 24, neck 16 and/or shoulders 18 in a range of less than 25 lbf and collar 130 applies a force to handle 20 to slide handle 20 along surface 132 for disengaging handle 20 from carrier 116 and translating handle 20 along transfer bead 24. In some embodiments, surface 132 applies a force to transfer bead 24 in a range of less than 25 lbf and collar 130 applies a force to handle 20 to slide handle 20 along surface 132 for disengaging handle 20 from carrier 116 and translating handle 20 along transfer bead 24. In some embodiments, carrier 116 applies a force to transfer bead 24, neck 16 and/or shoulders 18 in a range of 8 through 10 lbf to slide handle 20 along surface 132 for disengaging handle 20 from carrier 116 and translating handle 20 along transfer bead 24. In some embodiments, surface 132 applies a force to transfer bead 24 in a range of 8 through 10 lbf and collar 130 applies a force to handle 20 to slide handle 20 along surface 132 for disengaging handle 20 from carrier 116 and translating handle 20 along transfer bead 24. In some embodiments, handle 20 is released and/or dropped from carrier 116 such that handle 20 translates over neck 16 and bead 24 to slide handle 20 along surface 132 for disengaging handle 20 from carrier 116 and translating handle 20 along transfer bead 24.

Handle 20 includes tabs 34 extending from band 30 and/or handle 20 is fabricated from a resiliently biasing material such that tabs 34 rebound, return and/or rotate from the bent or folded orientation, as shown in FIG. 4, over a duration of time. As such, tabs 34 remain in a configuration that substantially defines expanded diameter D3 for a sufficient duration of time so that handle 20 translates over neck 16 and maintains a space and/or a non-interfering engagement between tabs 34 and transfer bead 24 to prevent interference therebetween.

Handle 20 translates over transfer bead 24 and tabs 34 are resiliently biased to the initial orientation shown in FIG. 3 such that tabs 34 are disposed at an angle a relative to plane P1 and/or axis X. Diameter D3 of tabs 34 contracts to diameter D2 in an orientation to engage surface 26, as shown in FIG. 16. In some embodiments, tabs 34 slowly and/or naturally close to the contracted orientation to define diameter D2 over a duration of at least two seconds. Diameter D2 is less than diameter D1 such that tabs 34 engage surface 26 of bead 24 to resist and/or prevent disengagement of handle 20 from container 12 such that container 12 can be transported and/or carried with handle 20, as described herein. In some embodiments, tabs 34 are biased to define diameter D2 over a duration of less than two seconds.

In some embodiments, this configuration of apparatus 100 includes a handle application device that applies a high strength, rigid handle 20 with a lightweight PET container 12. In some embodiments, this configuration of apparatus 100 includes a handle application device that does not expand or stretch band 30 for application of handle 20 with body 14. In some embodiments, this configuration of apparatus 100 includes a handle application device that applies handle 20 with container 12 independent and/or not dependent on the strength of the components of container 12, for example, body 14, neck 16 and/or shoulders 18. As such, the handle application device avoids application of load and/or a load greater than the top load strength of container 12. For example, the handle application device applies handle 20 with lightweight PET container 12 and avoids application of a force to the components of body 14 such as neck 16 and/or shoulders 18 that will plastically deform and/or cause failure of one or more components of body 14.

It will be understood that various modifications may be made to the embodiments disclosed herein. Therefore, the above description should not be construed as limiting, but merely as exemplification of the various embodiments. Those skilled in the art will envision other modifications within the scope and spirit of the claims appended hereto.

What is claimed is:

1. A method for applying a handle to a container, the method comprising the steps of:
   engaging at least one radially oriented tab of a handle to define a first diameter being greater than a diameter of a flange of a container having a top load strength in a range of 8 through 10 lbf;
   supporting the handle with an applicator;
   disengaging the handle from the applicator such that the at least one tab translates over the flange; and
   positioning the at least one tab to engage a surface of the flange to fix the handle with the container, the at least one tab being biased to define a second diameter that is less than the flange diameter.

2. A method as recited in claim 1, wherein the step of engaging includes moving the at least one tab relative to the handle prior to the step of disengaging.

3. A method as recited in claim 1, wherein the handle includes a band having the at least one tab connected thereto, the band being non-expandable via the apparatus.

4. A method as recited in claim 1, wherein the step of disengaging includes dropping the handle from the applicator.

5. A method as recited in claim 1, wherein the step of disengaging includes translating the handle over the flange in a configuration to resist and/or prevent interference therebetween.

6. A method as recited in claim 1, wherein the step of disengaging includes translating the handle over the flange such that the handle and the flange are spaced apart.

7. A method as recited in claim 1, wherein the step of engaging includes folding the at least one tab.

8. A method as recited in claim 1, wherein the handle defines a plane, the at least one tab being disposed in a perpendicular orientation relative to the plane to define the second diameter.

9. A method as recited in claim 1, wherein the handle includes a plurality of radial, inwardly oriented tabs.

10. A method as recited in claim 1, wherein the handle includes a plurality of spaced apart tabs.

11. A method as recited in claim 1, wherein the at least one tab is resiliently biased from the first diameter to the second diameter.

12. A method as recited in claim 1, wherein the at least one tab is resiliently biased to rotate from the first diameter to the second diameter over a duration of at least two seconds.

13. A method as recited in claim 1, wherein the handle includes a collar and a plurality of inward, radially oriented tabs extending from the collar, the collar being rigid relative to the tabs.

14. A container and handle system comprising:
   a container including a flange and a top load strength in a range of 8 through 10 lbf; and
   a handle including a circular inner edge and an opposite outer edge, the handle having at least one radially oriented tab that extends into the inner edge without extending through the outer edge, the at least one tab being movable to define a first diameter being greater than a diameter of the flange and configured to facilitate translation over the flange, and biased to a second diameter that is less than the flange diameter such that the at least one tab engages the flange to fix the handle with the container.

15. A container and handle system as recited in claim 14, wherein the handle translates over the flange in a configuration to resist and/or prevent interference therebetween.

16. A container and handle system as recited in claim 14, wherein the handle includes a plurality of radial, inwardly oriented tabs.

17. A container and handle system as recited in claim 14, wherein the at least one tab is resiliently biased to rotate from the first diameter to the second diameter over a duration of at least two seconds.

18. A container and handle system as recited in claim 14, wherein the outer edge comprises spaced apart first and second planar surfaces that are connected by a convex surface.

19. A container and handle system as recited in claim 14, further comprising and handle portion including a first arm that is coupled to the first planar surface and a second arm that is coupled to the second planar surface.

20. A container and handle system comprising:
   a container including a body and a neck that extends from the body, the neck having a transfer bead and a thread form that is spaced apart from the transfer bead, the transfer bead having a maximum diameter that is greater than a maximum diameter of the thread form, the transfer bead being positioned between the thread form and the body, the neck having a top load strength in a range of 8 through 10 lbf; the neck being free of any projections between the transfer bead and an interface between the body and the neck; and
   a handle including a circular inner edge and an opposite outer edge, the handle having a plurality of radial, inwardly oriented tabs that extend into the inner edge without extending through the outer edge, the tabs being rotatable to define a first diameter being greater than a diameter of the bead an configured to facilitate a non-interfering translation over the bead, and biased to a second diameter that is less than the bead diameter such that the tabs engage the bead to fix the handle with the container.

* * * * *